US006980410B2

(12) United States Patent
Kent

(10) Patent No.: US 6,980,410 B2
(45) Date of Patent: Dec. 27, 2005

(54) ACTIVE LIGHTNING PROTECTION SYSTEM AND METHOD

(76) Inventor: Charles Anthony Kent, Cellular South Suite 1400, 125 S. Congress St., Jackson, MS (US) 39201

(*) Notice: Subject to any disclaimer, the term of this patent is extended or adjusted under 35 U.S.C. 154(b) by 201 days.

(21) Appl. No.: 10/266,261

(22) Filed: Oct. 8, 2002

(65) Prior Publication Data

US 2003/0067731 A1 Apr. 10, 2003

Related U.S. Application Data

(60) Provisional application No. 60/327,292, filed on Oct. 9, 2001.

(51) Int. Cl.[7] .................................................. H01H 1/04

(52) U.S. Cl. ...................................... 361/118; 361/117

(58) Field of Search ........................ 361/118, 117, 111, 361/119, 212, 231; 324/72

(56) References Cited

U.S. PATENT DOCUMENTS

| 4,383,260 A | * | 5/1983 | Ryan .......................... 343/701 |
| 4,665,476 A | * | 5/1987 | Masuda ......................... 96/25 |
| 4,679,114 A | | 7/1987 | Carpenter, Jr. |
| 5,168,212 A | * | 12/1992 | Byerley et al. ............... 324/72 |
| 5,315,232 A | * | 5/1994 | Stewart ....................... 324/72 |
| 5,521,603 A | * | 5/1996 | Young ......................... 342/198 |
| 5,973,898 A | * | 10/1999 | Merchant et al. ............. 361/56 |

* cited by examiner

Primary Examiner—Brian Sircus
Assistant Examiner—Z Kitov
(74) Attorney, Agent, or Firm—Hunton & Williams

(57) ABSTRACT

An active lightning protection system and method is disclosed. According to one embodiment of the invention, the active lightning protection system includes a charge sensor that senses the build-up of charge associated with an imminent lightning strike in the proximity of a structure and a charge source to supply an opposite charge into the proximity to offset the build-up, thereby reducing the possibility of a strike to the structure.

19 Claims, 2 Drawing Sheets

ACTIVE LIGHTNING PROTECTION SYSTEM AND METHOD

This application claims benefit of provisional application 60/327,292, filed Oct. 9, 2002.

FIELD OF THE INVENTION

The present invention relates to a system and method for detecting and actively mitigating lightning hazards.

DESCRIPTION OF THE RELATED ART

Lightning strikes are one of the most common causes of service interruption within the wireless communications industry, particularly, to cellular and personal communications service (PCS) providers, and radio and TV broadcasters. Lightning occurs when there is a large build up of charged particles on the bottom side of a cloud, which in turn causes an opposite charge to build up in the ground beneath the cloud. Once the charge densities reach a certain magnitude or saturation level, the air gap between the cloud charge and the ground charge ionizes and a large current flows across the air-gap ("the lightning stroke") usually via the tallest structure, e.g., antenna or communications tower, located on the ground. Lightning strikes to a communication structure typically cause severe damage to sensitive and expensive electrical components and more importantly, may possibly injure living organisms located in close proximity to the structure.

Lightning rod protection systems provide a highly conductive path to allow the large current associated with lightning to flow from the top of a structure to the ground in order to "bleed off" the energy from the strike, i.e., the lightning's energy is kept away from sensitive equipment and living organisms. As shown in FIG. 1, a lightning rod system 100 is provided at a communications service provider structure 110 comprising a tower 112 and a building 114 housing electronic components. A lightning rod (not shown) is provided on the highest point of tower 112 and electrically coupled via cables 120 to a ring 130 inserted in the ground (grounded) at the base of tower 112, thereby attracting and then dissipating the energy from the strike. A drawback of this type of system is that the lightning rod becomes active only after a lightning stroke occurs and does nothing to prevent lightning from occurring in the first place. Moreover, very large currents associated with intense lightning strokes may overwhelm the lightning rod system, its accessories, and perhaps also damage adjacent components and people.

U.S. Pat. No. 4,679,114, which is incorporated in its entirety herein by reference, discloses a method for lightning protection through electric potential neutralization by applying a high-potential direct current ("DC") voltage to a vertical structural post carrying on its top a member adapted to radiate an electrical field of a magnitude, polarity, and duration adjusted by a control unit in response to the condition of the atmospheric charge as sensed and relayed to the control unit by a sensor. However, a disadvantage of this method is that it requires the mounting of additional equipment on top of the structure, which can be a dangerous, expensive, and a time consuming activity. Moreover, such equipment is susceptible to damage caused by high winds and other atmospheric conditions that typically accompany lightning generating storms.

SUMMARY OF THE INVENTION

The present invention overcomes these and other deficiencies of the related art by providing an active lightning protection system that reduces the possibility of lightning striking a structure in the first place.

It is an object of the invention to protect structures, equipment, and persons working or living near those structures from lightning strikes, and to detect and actively mitigate lightning hazards.

In an embodiment of the invention, an active lightning protection system and method senses a build-up of electrical charge associated with an imminent lightning strike in the ground around a structure to be protected. When the build-up exceeds a predetermined level, an opposite charge is fed into the ground around the structure or base thereof to offset the build-up and reduce the possibility of a lightning strike to the structure.

An advantage of the present invention is that it decreases the possibility of lightning striking a structure. Moreover, the present invention does not require any equipment to be mounted and maintained on the upper portions of the structure protected. In addition, implementation of the present invention decreases and possibly eliminates lightning strikes to communication towers, thereby decreasing the disruption to wireless communications, and radio and television broadcast systems.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Preferred embodiments of the present invention and their advantages are discussed in the context of preventing lightning from striking communication towers. Nevertheless, the inventive concept is designed to prevent a lightning strike to any type of structure, such as, but not limited to residential and commercial buildings, industrial plants, and other tall structures.

Figure 1:
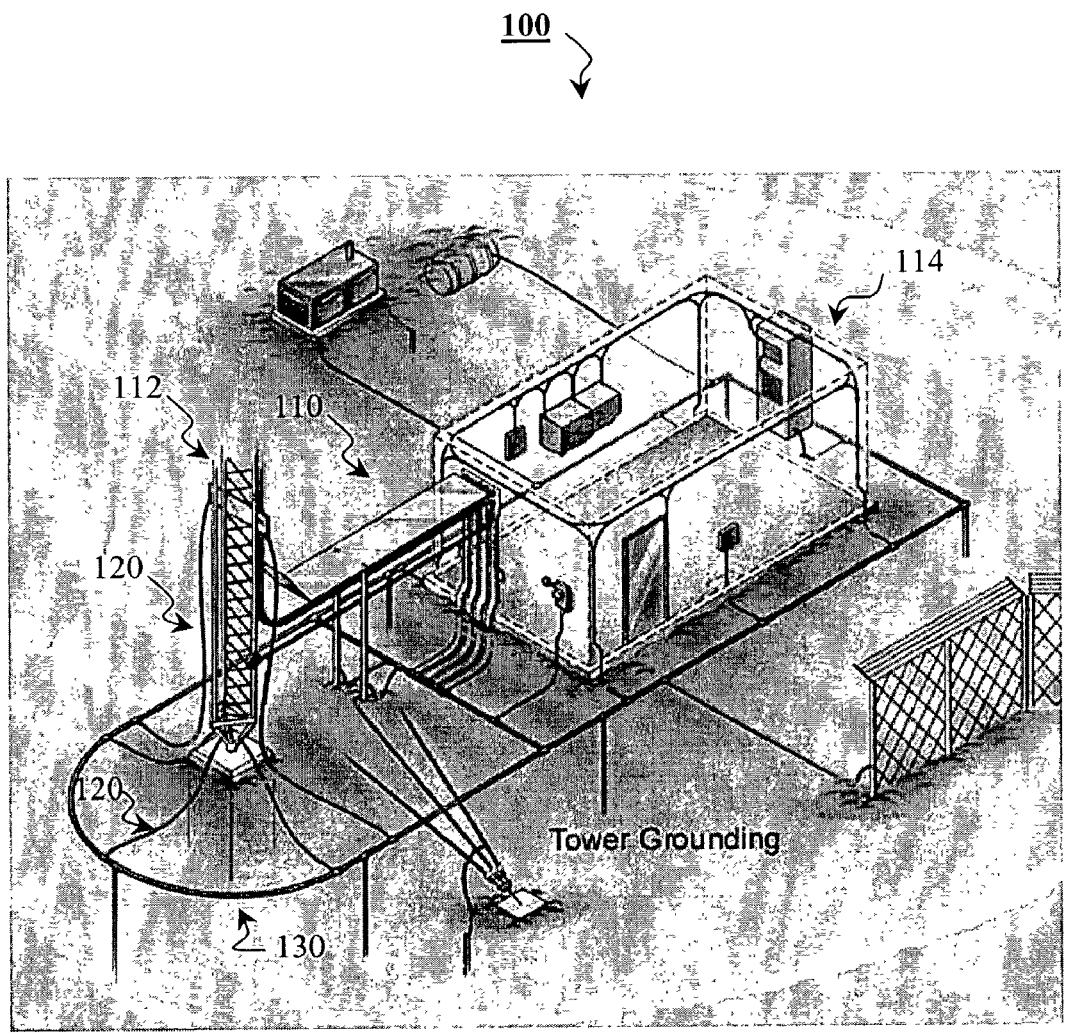
FIG. 1 depicts a typical conventional lightning rod system.
Figure 2:
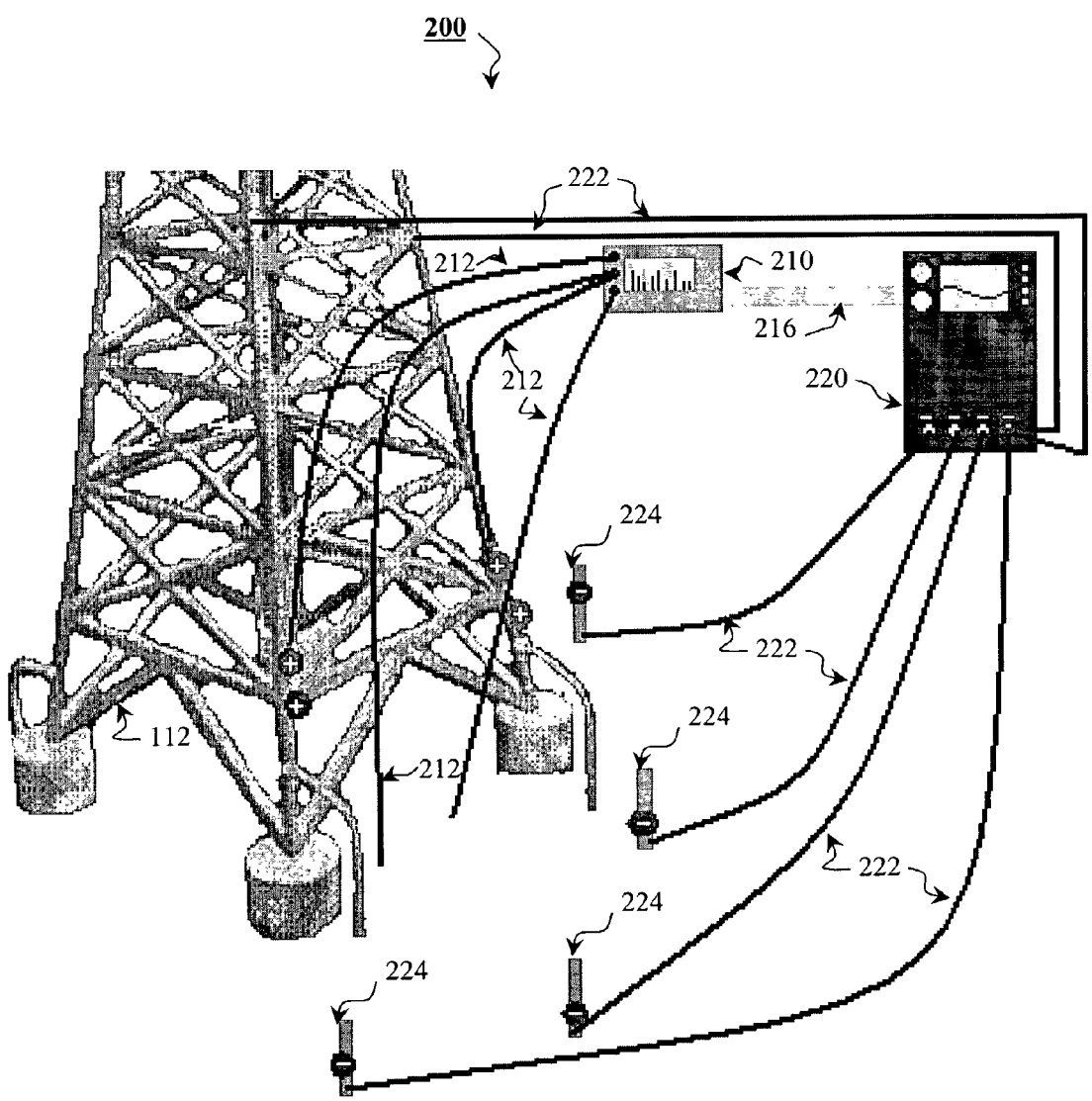
FIG. 2 is an active lightning protection system according to an embodiment of the invention.

Referring to FIG. 2, an active lightning protection system 200 is illustrated according to an embodiment of the invention. Particularly, active lightning protection system 200 comprises a charge sensor 210 and a charge source 220. Charge sensor 210 is coupled via electrical cables 212 to one or more active sensing elements (not shown) in proximity to the tower 112. For example, sensing elements can be disposed in the soil at or near the base of the tower 112 and/or on the legs of the tower 112. These sensing elements may surround all or a portion of tower 112. The sensing elements are in contact with the ground to measure the polarity and/or magnitude of charge within the soil to determine if a charge build-up is occurring. If a charge build-up occurs and exceeds a predetermined level, e.g., the level designating a high probability of a lightning strike occurring, sensor 210 signals charge source 220 via a communications link 216 to actively supply a DC current with the proper polarity and magnitude to dissipate the charge build-up in the ground. For example, charge source 220 supplies charge through electrical conductors 222 to inputs 224. Charge source 220 can be any type of source configured to supply DC charge, e.g., a DC current source, one or more large storage capacitors, an alternating current ("AC") source coupled to an AC-DC converter, and the like. Inputs 224 are disposed in proximity to the tower 112. For example, inputs 224 can be in the ground, on the legs of the tower 112, or in atmosphere near the tower 112. Preferably, if the sensors are placed on the tower legs, then the inputs 224 are placed solely in the nearby ground and not on tower legs. Similarly, if the sensors are placed in the nearby ground, then the inputs 224 placed on the tower legs and not in the ground near the sensors. In a preferred embodiment, conductors 222 and ground inputs 224 are disposed underneath the ground surface or electrically insulated in order to prevent charge discharge to surface objects.

In operation, the build-up of excess charge in the ground beneath and around the protected structure generally precedes a lightning strike. When an opposite charge is actively injected into the surrounding ground area or tower base during this build-up, the potential difference between the ground structure and the charged cloud is decreased, if not entirely neutralized. This results in the protected structure becoming electrically neutral or effectively invisible to lightning. Accordingly, the possibility of a lightning strike occurring to the structure is greatly diminished.

In an another embodiment of the invention, a processor is coupled to sensor 210 and charge source 220. The processor polls each sensing element in real time or at a necessary time interval to detect ground charge build-up. Control logic within the processor activates and controls charge source 220 once the predetermined charge or field strength level is exceeded.

In another embodiment of the invention, lightning protection system 200 can further comprise a display device, communications electronics, warning indicator, a programmable interface, memory, a printer, or a combination thereof. A display device displays information relating to the operation of the system, such as, but not limited to, charge polarity and charge magnitude measured by the sensing device. Such information can also be communicated to a remote location via a communication device, the identification and implementation of which is apparent to one of ordinary skill in the art. The communication device can also be adapted for receiving signals. For example, lightning protection system 200 can be in a stand-by or an off-state, and only becomes activated when a remote signal, such as a storm warning, is received. Moreover, operational logs may be printed out or stored via a respective printer and storage memory. A warning indicator, such as a siren or other type of signal can be useful to warn people in the vicinity of the structure of the high possibility of a lightning strike and/or the activation of the lightning protection system. A programmable interface can enable a programmer to program the processor, e.g., set or change the predetermined level that activates charge source 220.

In an alternative embodiment, sensor 210 can measure charge build-up at other locations, such as, the atmosphere around tower 112 or on the tower itself.

Although the invention has been particularly shown and described with reference to several preferred embodiments thereof, it will be understood by those skilled in the art that various changes in form and details may be made therein without departing from the spirit and scope of the invention as defined in the appended claims.

I claim:

1. A lightning protection system comprising:
   a charge sensor for detecting a charge build-up at or in proximity to a structure;
   wherein said charge sensor is coupled to one or more sensing elements located proximate to a base structure; and
   a charge source to supply, upon activation, an opposite charge to inputs located proximate to or in the ground at a base of said structure to dissipate said charge build-up.

2. The system of claim 1, wherein said structure is a wireless communications tower.

3. The system of claim 1, wherein
   said one or more sensing elements coupled to said charge sensor are in direct contact with said base of said structure and said inputs are in direct contact with the ground at said base of said structure.

4. The system of claim 1, wherein said activation occurs when said charge build-up exceeds a predetermined level.

5. The system of claim 4, wherein said predetermined level is associated with a high probability of lightning striking said structure.

6. The system of claim 1, wherein said charge source is a DC source.

7. The system of claim 1, wherein said charge source comprises one or more capacitors.

8. The system of claim 1 further comprising
   a processor configured to receive information relating to said charge build-up detected by said charge sensor and to activate and control said charge source.

9. The system of claim 1 further comprising
   a warning indicator to warn people in vicinity of said structure of the activation of said charge source.

10. The system of claim 8 further comprising
    communication electronics coupled to said processor.

11. The system of claim 10 wherein said processor activates said charge sensor upon reception of an activation signal received by said communication electronics.

12. A method for protecting a structure from lightning comprising:
    detecting a charge build-up at or in proximity to the around near said structure; and
    supplying a charge, opposite in polarity to said charge build-up, to a base of said structure or nearby the ground at said structure to dissipate said charge build-up.

13. The method of claim 12, wherein said structure is a communication tower.

14. The method of claim 12, wherein said charge build-up is detected in the ground located at said base of said structure.

15. The method of claim 12, wherein said supplying step occurs when said charge build-up exceeds a predetermined level.

16. The method of claim 15, wherein said predetermined level is association with a high probability of lightning striking said structure.

17. The method of claim 12, further comprising
    executing a warning signal in a vicinity of said structure prior to supplying said opposite charge.

18. The method of claim 12, further comprising
    activating said sensing device upon reception of an activation signal received by communication electronics.

19. The system of claim 1, wherein
    said one or more sensing elements coupled to said charge sensor are in direct contact with the ground at said base of said structure and said inputs are in direct contact with said base of said structure.

* * * * *